(12) United States Patent
Wang et al.

(10) Patent No.: US 11,548,329 B2
(45) Date of Patent: Jan. 10, 2023

(54) INTELLIGENT TIRE

(71) Applicant: SHANDONG LINGLONG TYRE CO., LTD., Zhaoyuan (CN)

(72) Inventors: Feng Wang, Zhaoyuan (CN); Ming Li, Zhaoyuan (CN); Haitao Sui, Zhaoyuan (CN); Longyue Zheng, Zhaoyuan (CN); Shuai Liu, Zhaoyuan (CN); Liran Teng, Zhaoyuan (CN); Shaojing Wang, Zhaoyuan (CN); Guanchao Zhang, Zhaoyuan (CN); Jianlei Sun, Zhaoyuan (CN)

(73) Assignee: SHANDONG LINGLONG TYRE CO., LTD., Zhaoyuan (CN)

( * ) Notice: Subject to any disclaimer, the term of this patent is extended or adjusted under 35 U.S.C. 154(b) by 564 days.

(21) Appl. No.: 16/609,215

(22) PCT Filed: Feb. 24, 2018

(86) PCT No.: PCT/CN2018/077109
§ 371 (c)(1),
(2) Date: Oct. 29, 2019

(87) PCT Pub. No.: WO2018/214601
PCT Pub. Date: Nov. 29, 2018

(65) Prior Publication Data
US 2020/0055352 A1  Feb. 20, 2020

(30) Foreign Application Priority Data

May 23, 2017  (CN) .......................... 201710368730.0
May 23, 2017  (CN) .......................... 201720578252.1

(51) Int. Cl.
*B60C 23/04* (2006.01)
*B60C 23/20* (2006.01)
(Continued)

(52) U.S. Cl.
CPC .............. *B60C 23/04* (2013.01); *B60C 23/20* (2013.01); *H01Q 1/2241* (2013.01); *B29D 2030/0077* (2013.01); *G06K 19/07764* (2013.01)

(58) Field of Classification Search
CPC ........ B60C 23/04; B60C 23/20; H01Q 1/2241
(Continued)

(56) References Cited

U.S. PATENT DOCUMENTS

2007/0295070 A1* 12/2007 Huang ................ B60C 23/0433
73/146
2010/0090013 A1*  4/2010 Jung ................ G06K 19/07764
235/492

(Continued)

FOREIGN PATENT DOCUMENTS

CN       1688455 A    10/2005
CN     101348059 A     1/2009
(Continued)

*Primary Examiner* — Ahshik Kim
(74) *Attorney, Agent, or Firm* — Bayramoglu Law Offices LLC

(57) ABSTRACT

An intelligent tire monitoring system includes a tire body, a sheet-shaped conductive polymer sensor, a micro control unit, an RF unit, a computer, and an RF circuit. The sheet-shaped conductive polymer sensor is affixed to an inner liner layer at a middle portion of a tire crown. One end of the sheet-shaped conductive polymer sensor is connected to the micro control unit through the RF unit, and the other end of the sheet-shaped conductive polymer sensor is connected to the computer through the RF circuit. The computer includes a power supply module, a communication port, a display screen, an audible alarm, a press-key input module, and a processor. The state of the tire is comprehensively determined by matching or combining a strain amplitude of the tire crown and an operating temperature with a fitting function.

8 Claims, 4 Drawing Sheets

(51) Int. Cl.
*H01Q 1/22* (2006.01)
*B29D 30/00* (2006.01)
*G06K 19/077* (2006.01)

(58) Field of Classification Search
USPC .................................................. 152/152.1
See application file for complete search history.

(56) References Cited

U.S. PATENT DOCUMENTS

| | | | |
|---|---|---|---|
| 2011/0198402 A1* | 8/2011 | Tucker | G06K 19/07749 235/492 |
| 2015/0075693 A1* | 3/2015 | Dorfi | B60C 13/04 156/60 |
| 2016/0031272 A1* | 2/2016 | Peine | B60C 11/246 340/442 |

FOREIGN PATENT DOCUMENTS

| | | |
|---|---|---|
| CN | 101710027 A | 5/2010 |
| CN | 104417290 A | 3/2015 |
| CN | 104589928 A | 5/2015 |
| CN | 104786752 A | 7/2015 |
| CN | 107116977 A | 9/2017 |
| CN | 206733974 U | 12/2017 |
| DE | 102011006646 A1 | 10/2012 |
| EP | 1757464 A1 | 2/2007 |
| EP | 1867498 A2 | 12/2007 |

\* cited by examiner

INTELLIGENT TIRE

CROSS REFERENCE TO THE RELATED APPLICATIONS

This application is the national phase entry of International Application No. PCT/CN2018/077109, filed on Feb. 24, 2018, which is based upon and claims priority to Chinese Patent Application No. 201710368730.0, filed on May 23, 2017 and No. 201720578252.1, filed on May 23, 2017, the entire contents of which are incorporated herein by reference.

TECHNICAL FIELD

The present disclosure relates to the technical field of tire failure warning systems, and more particularly to an intelligent tire monitoring system capable of early detection and warning of dangerous tire use conditions.

BACKGROUND

Tires are an indispensable part of the car driving system, and the characteristics of tires directly affect automobile performance such as safety, stability, smooth driving, comfort and transportation efficiency. According to the statistics from the information center of the Ministry of Transport of the People's Republic of China, tire bursting, fatigued driving and speeding are the three leading causes of highway traffic accidents wherein tire bursting is a primary factor one due to the complexity and uncontrollable nature of tire pressure and temperature. Traffic accidents caused by tire failure have caused great losses to society, thus making tire burst prevention a significant research subject in the automotive electronic technology industry. Presently, the tire pressure monitoring system has been used to monitor the air pressure and temperature of tires, however, the causes of dangerous tire conditions do not merely lie in the tire pressure and temperature. Thus, the common tire pressure monitoring system is unable to provide early warning signals of all dangerous tire conditions. In addition, the sensor in the existing tire pressure monitoring system is expensive, which limits the application range thereof.

SUMMARY

The objective of the present disclosure is to provide an intelligent tire monitoring system to solve the above-mentioned problems of the inability of the existing tire pressure monitoring to provide early warning signals of all dangerous tire conditions, and the high price point of the sensor in the tire pressure monitoring system.

In order to achieve the above objective, the present disclosure provides the following technical solution: an intelligent tire monitoring system, including a tire body, a tire tread layer, a neutral layer, an inner liner layer, a sheet-shaped conductive polymer sensor, a micro control unit, a radio frequency (RF) unit, a computer, and an RF circuit, wherein the tire body is successively provided with the tire tread layer, the neutral layer and the inner liner layer from outside to inside; the sheet-shaped conductive polymer sensor is affixed to the inner liner layer at a middle portion of the tire crown; one end of the sheet-shaped conductive polymer sensor is connected to the micro control unit through the RF unit, and the other end of the sheet-shaped conductive polymer sensor is connected to the computer through the RF circuit; the computer includes a power supply module, a communication port, a display screen, an audible alarm, a press-key input module, and a processor, wherein the processor is electrically connected to the power supply module, the processor is connected to and controls the display screen and the audible alarm, the communication port is interconnected to the processor, and the press-key input module is connected to the processor.

Preferably, the sheet-shaped conductive polymer sensor is bonded to the inner liner layer by an adhesive.

Preferably, the sheet-shaped conductive polymer sensor is coagulated with the inner liner layer to form into a one piece by low-temperature low-pressure vulcanization.

Preferably, the sheet-shaped conductive polymer sensor has a positive temperature effect and a positive tensile effect.

Preferably, a material of the sheet-shaped conductive polymer sensor is a conductive rubber.

Preferably, the RF circuit is a semi-active radio frequency identification device (RFID).

The present disclosure has the following advantages over the prior art. The intelligent tire monitoring system is mainly designed for early warnings of dangerous tire conditions. Specifically, the intelligent tire monitoring system can comprehensively determine the state of the tire by utilizing the strain amplitude of the tire crown and the operating temperature with a fitting function. The intelligent tire monitoring system can also achieve the early warnings of various dangerous tire conditions by using a single conductive polymer sensor to simultaneously obtain the strain amplitude and the operating temperature. Furthermore, the sheet-shaped conductive polymer sensor has a low cost and thus is readily popular.

Figure 1:
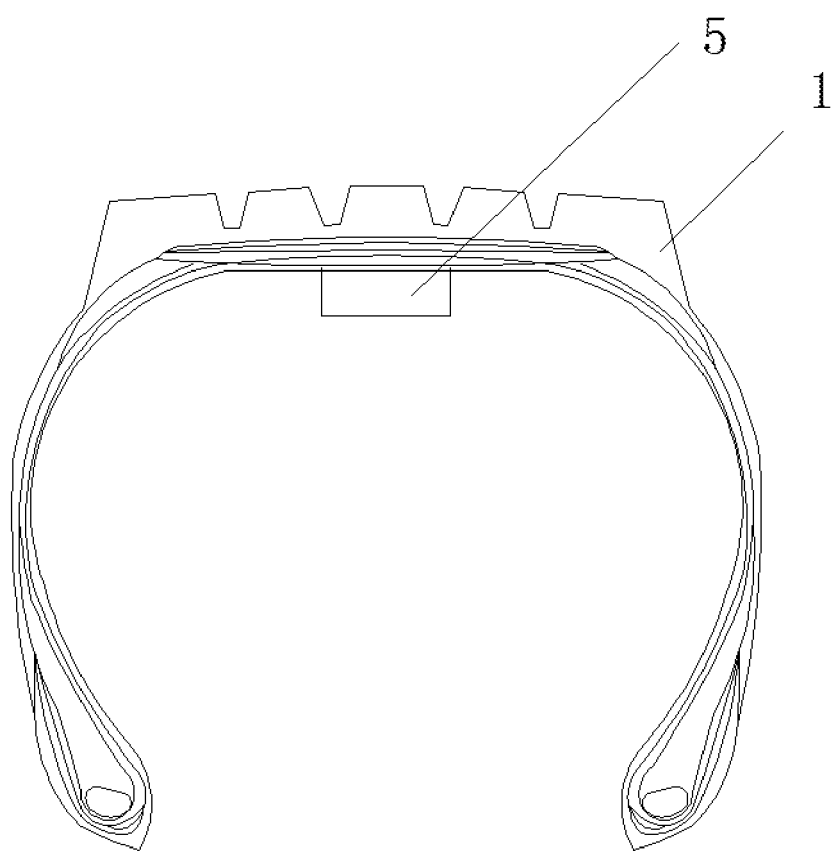
FIG. 1 is a schematic diagram showing a bonding position of a sheet-shaped conductive polymer sensor of the present disclosure.

In the drawings: 1, tire body; 2, tire tread layer; 3, neutral layer; 4, inner liner layer; 5, sheet-shaped conductive polymer sensor; 6, micro control unit; 7, RF unit; 8, computer; 9, RF circuit; 8-1, power supply module; 8-2, communication port; 8-3, display screen; 8-4, audible alarm; 8-5, press-key input module; 8-6, processor.

DETAILED DESCRIPTION OF THE EMBODIMENTS

The technical solution of the embodiments of the present disclosure will be clearly and completely described hereinafter with reference to the drawings of the embodiments of the present disclosure. Obviously, the described embodiments are only a part of the embodiments of the present disclosure rather than all the embodiments. Based on the embodiments of the present disclosure, all other embodiments obtained by those skilled in the art without creative efforts shall fall within the scope of the protection of the present disclosure.

Figure 2:
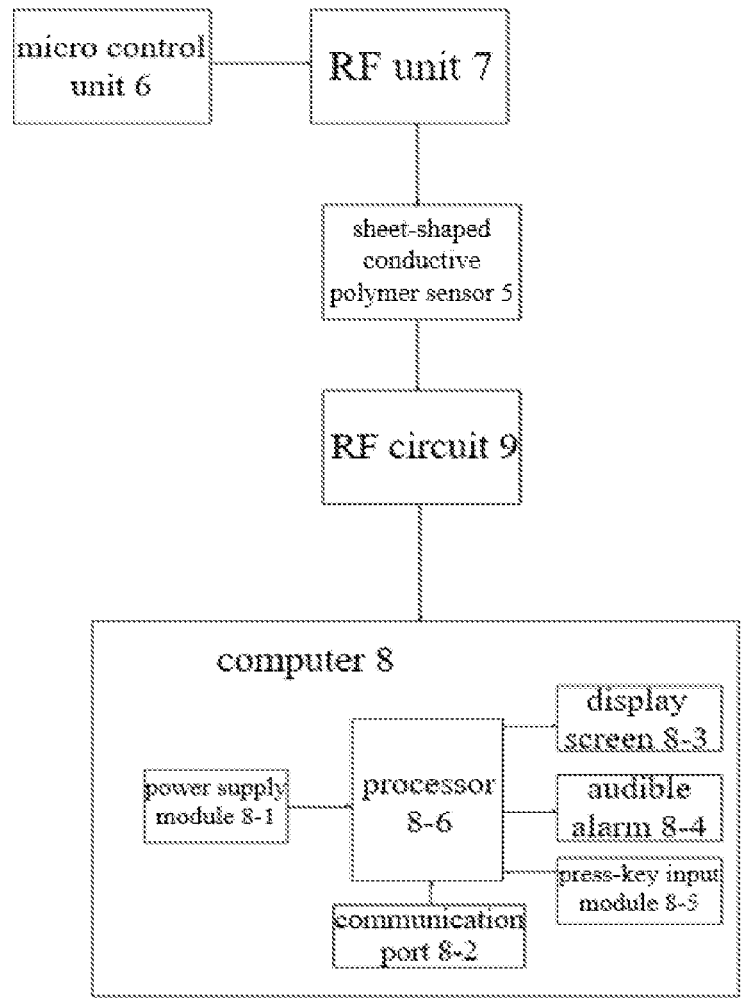
FIG. 2 is a schematic block diagram of a system configuration of the intelligent tire monitoring system of the present disclosure.
Figure 3:
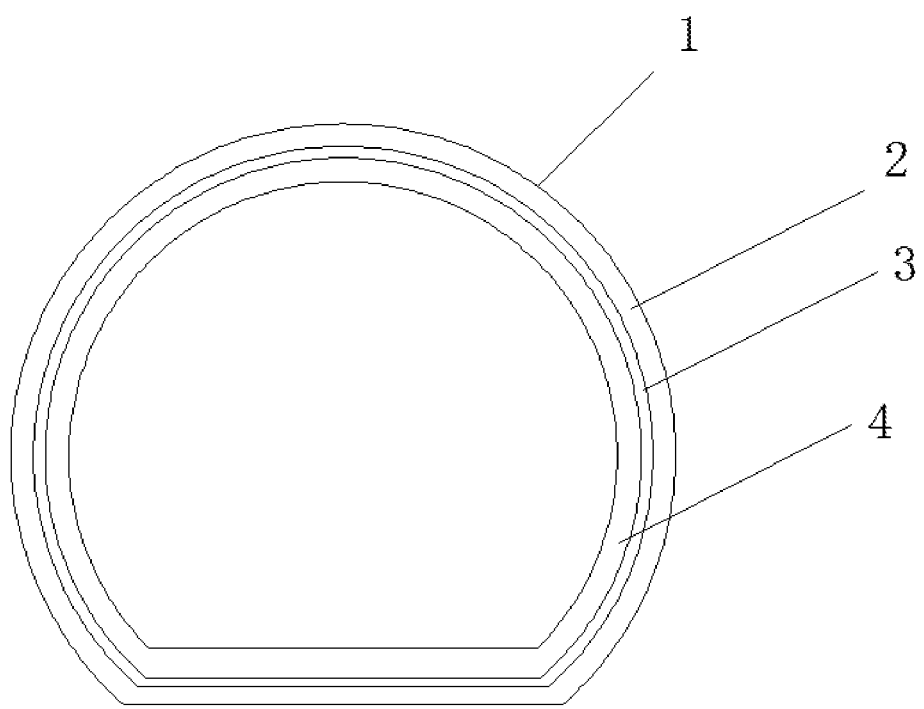
FIG. 3 is a structural schematic diagram showing crown deformation of the tire in a rolling state.
Figure 4:
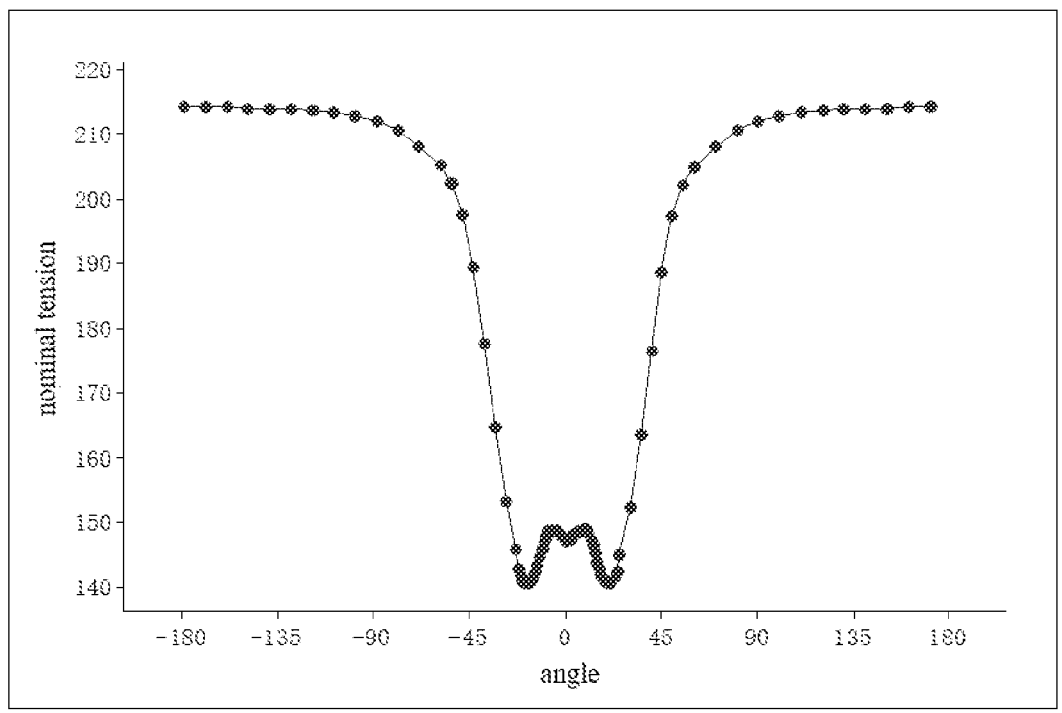
FIG. 4 is a schematic diagram showing a relationship of an angle and a nominal tension of the tire crown of the tire in the rolling state.

As shown in FIGS. 1-4, the present disclosure provides a technical solution as follows. An intelligent tire monitoring system includes the tire body 1, the tire tread layer 2, the neutral layer 3, the inner liner layer 4, the sheet-shaped conductive polymer sensor 5, the micro control unit 6, the RF unit 7, the computer 8 and the RF circuit 9. The tire body 1 is successively provided with the tire tread layer 2, the neutral layer 3 and the inner liner layer 4 from outside to inside. The sheet-shaped conductive polymer sensor 5 is affixed to the inner liner layer 4 at a middle portion of the tire crown, and the sheet-shaped conductive polymer sensor 5 is bonded to the inner liner layer 4 by the adhesive or is coagulated with the inner liner layer 4 to form into one piece by low-temperature low-pressure vulcanization. One end of the sheet-shaped conductive polymer sensor 5 is connected to the micro control unit 6 through the RF unit 7, and the other end of the sheet-shaped conductive polymer sensor 5 is connected to the computer 8 through the RF circuit 9. The RF circuit 9 is a semi-active RFID. The material of the sheet-shaped conductive polymer sensor 5 is a conductive rubber, the sheet-shaped conductive polymer sensor 5 has a positive temperature effect, i.e. the impedance of the sheet-shaped conductive polymer sensor 5 increases with the increasing temperature, thereby obtaining the temperature signal of the tires during the drive. Moreover, since the sheet-shaped conductive polymer sensor 5 has a critical temperature, i.e. when the temperature exceeds the critical temperature thereof, the impedance of the sheet-shaped conductive polymer sensor 5 is sharply increased, thereby obtaining a high temperature alarm signal. The critical temperature of the sheet-shaped conductive polymer sensor 5 should be higher than the internal temperature of the tire in normal use, but not higher than the internal temperature capable of damaging the tire rubber. The sheet-shaped conductive polymer sensor 5 has a positive tensile effect, i.e. the impedance thereof increases in a stretched state, and decreases in a compressed state. Since the changing amplitudes of the circumferential nominal tension of the tire crown reach a maximum amplitude at the tread-in/tread-out position, resulting in a maximum amplitude of the impedance change of the sheet-shaped conductive polymer sensor 5. The computer 8 includes the power supply module 8-1, the communication port 8-2, the display screen 8-3, the audible alarm 8-4, the press-key input module 8-5, and the processor 8-6. The processor 8-6 is electrically connected to the power supply module 8-1. The processor 8-6 is connected to and controls the display screen 8-3 and the audible alarm 8-4. The communication port 8-2 is connected to the processor 8-6 in a bidirectional manner. The press-key input module 8-5 is connected to the processor 8-6.

The working principle is as follows. Since the impedance of the sheet-shaped conductive polymer sensor 5 affixed to the inner liner layer 4 at the middle portion of the tire crown of the tire body 1 is affected by temperature and strain, in order to separate the temperature signal and the strain signal, the RF unit 7 is controlled by the micro control unit 6 to perform a frequency scanning on the sheet-shaped conductive polymer sensor 5. Then, the impedance change of the sheet-shaped conductive polymer sensor 5 is analyzed by the main cause analysis, and the impedance change caused by the temperature and the strain is separated to obtain the temperature and strain information. Subsequently, the sheet-shaped conductive polymer sensor 5 transmits the temperature and strain data to the computer 8 through the RF circuit. The data are substituted into the fitting formula introduced by the communication port 8-2 for calculating the danger coefficient, so as to obtain the danger coefficient of the tires during the drive. When the tires are running in excess of the predetermined danger coefficient for more than a certain period of time, the computer 8 issues alarms through the display screen 8-3 and the audible alarm 8-4. The foregoing process is the working principle of the intelligent tire monitoring system.

Although the embodiments of the present disclosure have been shown and described, it is understood for those skilled in the art that various changes, modifications, substitutions and variations can be made to the embodiments without departing from the spirit and scope of the present disclosure, and the scope of the present disclosure is defined by the claims and the equivalents thereof.

What is claimed is:

1. An intelligent tire monitoring system, comprising:
a tire body,
a sheet-shaped conductive polymer sensor,
a micro control unit,
an RF unit,
a computer, and
an RF circuit,
wherein the tire body is successively provided with a tire tread layer, a neutral layer, and an inner liner layer from outside to inside;
wherein the sheet-shaped conductive polymer sensor is affixed to the inner liner layer at a middle portion of a tire crown; a first end of the sheet-shaped conductive polymer sensor is connected to the micro control unit through the RF unit, and a second end of the sheet-shaped conductive polymer sensor is connected to the computer through the RF circuit;
wherein the RF unit is configured to be controlled by the micro control unit to perform a frequency scanning on the sheet-shaped conductive polymer sensor, and
wherein the computer comprises:
a power supply module,
a communication port,
a display screen,
an audible alarm,
a press-key input module, and
a processor,
wherein the processor is electrically connected to the power supply module, the display screen, and the audible alarm, and wherein the processor is configured to control the display screen and the audible alarm,
wherein the communication port is interconnected to the processor, and
wherein the press-key input module is connected to the processor.

2. The intelligent tire monitoring system according to claim 1, wherein the sheet-shaped conductive polymer sensor is bonded to the inner liner layer by an adhesive.

3. The intelligent tire monitoring system according to claim 1, wherein the sheet-shaped conductive polymer sensor is coagulated with the inner liner layer to form into one piece by a low-temperature low-pressure vulcanization.

4. The intelligent tire monitoring system according to claim 1, wherein the sheet-shaped conductive polymer sensor has a positive temperature effect and a positive tensile effect.

5. The intelligent tire monitoring system according to claim 1, wherein a material of the sheet-shaped conductive polymer sensor is a conductive rubber.

6. The intelligent tire monitoring system according to claim 1, wherein the RF circuit is a semi-active RFID.

7. A method of operating the intelligent tire monitoring system according to claim 1, comprising:

controlling the RF unit by the micro control unit to perform a frequency scanning on the sheet-shaped conductive polymer sensor;

analyzing an impedance change of the sheet-shaped conductive polymer sensor, separating an impedance signal caused by a temperature from an impedance signal caused by a strain to obtain an impedance data from the temperature and an impedance data from the strain;

transmitting the impedance data from the temperature and the impedance data from the strain by the sheet-shaped conductive polymer sensor to the computer through the RF circuit;

providing the impedance data from the temperature and the impedance data from the strain into a fitting formula introduced by the communication port for calculating a danger coefficient to obtain the danger coefficient of a tire during a drive.

8. The method of operating the intelligent tire monitoring system according to claim 7, wherein the computer alarms through the display screen and the audible alarm when the danger coefficient of the tire is larger than a predetermined value for a predetermined period of time.

\* \* \* \* \*